(12) United States Patent
Ullberg (10) Patent No.: US 12,158,549 B2
(45) Date of Patent: Dec. 3, 2024

(54) METHOD OF READING OUT DATA IN A RADIATION DETECTOR, RADIATION DETECTOR AND IMAGING APPARATUS (71) Applicant: DIRECT CONVERSION AB, Danderyd (SE)

(72) Inventor: Christer Ullberg, Sollentuna (SE)

(73) Assignee: Varex Imaging Sweden AB, Danderyd (SE)

( * ) Notice: Subject to any disclaimer, the term of this patent is extended or adjusted under 35 U.S.C. 154(b) by 328 days.

(21) Appl. No.: 17/611,071

(22) PCT Filed: May 13, 2019

(86) PCT No.: PCT/EP2019/062150
§ 371 (c)(1),
(2) Date: Nov. 12, 2021

(87) PCT Pub. No.: WO2020/228935
PCT Pub. Date: Nov. 19, 2020

(65) Prior Publication Data
US 2022/0221596 A1 Jul. 14, 2022

(51) Int. Cl.
*G01T 1/17* (2006.01)
*G01T 1/24* (2006.01)
(52) U.S. Cl.
CPC ............... *G01T 1/17* (2013.01); *G01T 1/247* (2013.01)
(58) Field of Classification Search
None
See application file for complete search history.

(56) References Cited

U.S. PATENT DOCUMENTS 4,801,803 A * 1/1989 Denen ................... H03F 3/1935
250/336.1
6,248,990 B1 6/2001 Pyyhtiä et al.
(Continued)

FOREIGN PATENT DOCUMENTS

CN 1499834 5/2004
CN 101545978 9/2009
(Continued)

OTHER PUBLICATIONS

English machine translation of CN110383108A (Year: 2019).*
(Continued)

*Primary Examiner* — David P Porta
*Assistant Examiner* — Djura Malevic
(74) *Attorney, Agent, or Firm* — Laurence & Phillips IP Law (57) ABSTRACT

A method of reading out data in a radiation detector having pixels and associated readout circuits, which each have a register. After the pixels detect radiation, data indicative of the radiation is stored in the register(s) of each readout circuit, each time during a plurality of data acquisition periods. Data is read out from the register(s) of each readout circuit, each time during a plurality of readout periods. Each readout period follows a data acquisition period, and each readout period being either a low energy readout period or a high energy readout period. Only data from a single register of each readout circuit indicative of radiation energy above a low energy level is read out during each low energy readout period. Data indicative of radiation energy above a high energy level, higher than the low energy level, is read out during each high energy readout period.

19 Claims, 6 Drawing Sheets

(56) References Cited

U.S. PATENT DOCUMENTS

| | | | | |
|---|---|---|---|---|
| 6,924,486 | B2* | 8/2005 | Schick | H04N 23/651 |
| | | | | 250/370.08 |
| 6,972,411 | B2* | 12/2005 | Schick | A61B 6/563 |
| | | | | 348/E3.018 |
| 7,072,443 | B2* | 7/2006 | Schick | A61B 5/0088 |
| | | | | 378/191 |
| 7,095,005 | B2 | 8/2006 | Izumi | |
| 7,193,219 | B2* | 3/2007 | Schick | A61B 5/0088 |
| | | | | 250/370.11 |
| 7,196,333 | B1* | 3/2007 | Gerstenmayer | H01L 31/115 |
| | | | | 257/E31.086 |
| 7,609,309 | B2* | 10/2009 | Brown | H04N 25/71 |
| | | | | 348/312 |
| 7,826,587 | B1* | 11/2010 | Langan | A61B 6/482 |
| | | | | 378/20 |
| 7,902,976 | B2* | 3/2011 | Doughty | G01T 1/247 |
| | | | | 340/539.22 |
| 7,995,702 | B2* | 8/2011 | Xu | G01N 23/046 |
| | | | | 378/4 |
| 8,306,180 | B2* | 11/2012 | Zhang | G01V 5/0041 |
| | | | | 378/57 |
| 8,736,924 | B2* | 5/2014 | Nelson | H04N 25/711 |
| | | | | 358/482 |
| 9,411,055 | B2 | 8/2016 | Yoon et al. | |
| 9,426,400 | B2* | 8/2016 | Brown | G01N 21/8851 |
| 9,468,406 | B2* | 10/2016 | Dieckmann | G01T 1/026 |
| 9,517,045 | B2* | 12/2016 | Kang | A61B 6/4233 |
| 9,943,279 | B2* | 4/2018 | Fan | A61B 6/032 |
| 9,986,957 | B2* | 6/2018 | Cho | A61B 6/032 |
| 10,107,920 | B2* | 10/2018 | Danzer | H01L 27/14661 |
| 10,117,626 | B2* | 11/2018 | Fu | A61B 6/032 |
| 10,420,519 | B2* | 9/2019 | Koehler | A61B 6/482 |
| 10,788,594 | B2* | 9/2020 | Herrmann | G01T 1/247 |
| 11,131,778 | B2* | 9/2021 | Trost | G01T 1/02 |
| 2004/0000630 | A1 | 1/2004 | Spartiotis et al. | |
| 2004/0065836 | A1* | 4/2004 | Schick | A61B 6/563 |
| | | | | 348/E3.018 |
| 2004/0065837 | A1* | 4/2004 | Schick | G01T 1/246 |
| | | | | 250/370.08 |
| 2004/0066898 | A1* | 4/2004 | Schick | A61B 6/4494 |
| | | | | 378/98.9 |
| 2004/0195512 | A1* | 10/2004 | Crosetto | A61B 6/037 |
| | | | | 250/363.04 |
| 2006/0103725 | A1* | 5/2006 | Brown | H04N 25/71 |
| | | | | 348/92 |
| 2006/0193436 | A1* | 8/2006 | Schick | H04N 23/66 |
| | | | | 378/98.8 |
| 2007/0075251 | A1* | 4/2007 | Doughty | G01T 1/247 |
| | | | | 250/370.01 |
| 2009/0290680 | A1* | 11/2009 | Tumer | G01T 1/249 |
| | | | | 250/311 |
| 2011/0121980 | A1* | 5/2011 | Doughty | G01T 1/026 |
| | | | | 250/370.07 |
| 2011/0158498 | A1* | 6/2011 | Li | G06T 11/008 |
| | | | | 378/62 |
| 2012/0039440 | A1* | 2/2012 | Fan | A61B 6/482 |
| | | | | 378/62 |
| 2012/0280131 | A1 | 11/2012 | Spartiotis et al. | |
| 2013/0176552 | A1* | 7/2013 | Brown | H04N 25/772 |
| | | | | 356/51 |
| 2013/0201316 | A1* | 8/2013 | Binder | H04L 67/12 |
| | | | | 701/2 |
| 2013/0202178 | A1* | 8/2013 | Shechter | A61B 6/4035 |
| | | | | 382/131 |
| 2013/0240712 | A1 | 9/2013 | Takenaka et al. | |
| 2013/0308745 | A1* | 11/2013 | Goshen | G06T 11/005 |
| | | | | 378/5 |
| 2014/0158864 | A1* | 6/2014 | Brown | H04N 25/768 |
| | | | | 250/208.1 |
| 2014/0185760 | A1* | 7/2014 | Kim | A61B 6/0414 |
| | | | | 378/62 |
| 2015/0131783 | A1 | 5/2015 | Sato | |
| 2015/0168570 | A1* | 6/2015 | Pelc | G01N 23/046 |
| | | | | 378/5 |
| 2015/0177159 | A1* | 6/2015 | Brown | G01N 21/9501 |
| | | | | 250/208.1 |
| 2016/0106386 | A1* | 4/2016 | Fan | A61B 6/5235 |
| | | | | 382/131 |
| 2016/0259067 | A1 | 9/2016 | Morton | |
| 2016/0356890 | A1* | 12/2016 | Fried | G01S 7/4863 |
| 2016/0370475 | A1 | 12/2016 | Kawata et al. | |
| 2017/0234996 | A1* | 8/2017 | Herrmann | G01T 1/247 |
| | | | | 250/370.08 |

FOREIGN PATENT DOCUMENTS

| | | | | |
|---|---|---|---|---|
| CN | 103860184 | | 6/2014 | |
| CN | 104220899 | | 12/2014 | |
| CN | 104622489 | | 5/2015 | |
| CN | 108139494 | | 6/2018 | |
| CN | 110383108 | A * | 10/2019 | G01T 1/17 |
| GB | 2322233 | | 8/1998 | |
| GB | 2332562 | | 6/1999 | |
| JP | 2006101926 | | 4/2006 | |
| KR | 20160006918 | | 1/2016 | |
| WO | WO-2005008286 | A2 * | 1/2005 | G01T 1/026 |
| WO | 2005/008286 | | 11/2005 | |
| WO | 2016034976 | | 3/2016 | |
| WO | WO-2016034976 | A1 * | 3/2016 | G01T 1/247 |

OTHER PUBLICATIONS

CN20198096308, Office Action dated Jun. 16, 2023.
CN20198096308, Search Report dated Jun. 16, 2023.
EP 19 724 421.3, Result of consulation of Aug. 26, 2022 dated Sep. 2, 2022.
PCT/EP2019/062150, International Preliminary Report on Patentability mailed on Nov. 16, 2021.
PCT/EP2019/062150, International Search Report and Written Opinion mailed on Jan. 8, 2020.
EP 19 724 421.3, Communication under Rule 71(3) dated Apr. 12, 2023.
EP 19 724 421.3, Response dated May 26, 2023.

* cited by examiner

METHOD OF READING OUT DATA IN A RADIATION DETECTOR, RADIATION DETECTOR AND IMAGING APPARATUS

The present application claims priority to International Application No. PCT/EP2019/062150 filed on May 13, 2019, titled "Method of Reading Out Data in a Radiation Detector, Radiation Detector and Imaging Apparatus," which is incorporated by reference herein, and is assigned to the assignee of the present invention.

FIELD OF THE INVENTION

The present disclosure generally relates to radiation detectors. In particular, a method of reading out data in a radiation detector, a radiation detector and an imaging apparatus, are provided.

BACKGROUND

Various radiation detectors for detecting ionizing radiation are known in the art. A radiation source transmits radiation through an object, such as a patient, and the radiation detector measures the attenuated radiation. The radiation is converted to an electrical signal, a control unit processes these signals and the desired images can be provided.

In some applications, for example in computed tomography (CT) applications, there is a benefit from using multiple energies for the acquisition of frame data. Multiple energy imaging enables improved reconstructions. Multiple energy imaging however generates very large data sets. Moreover, the readout of data indicative of radiation at different energy levels requires longer readout periods. The readout periods are typically required to be twice as long for reading out two energy levels in comparison with reading out a single energy level.

US 2016106386 A1 discloses methods and systems for weighting material density images based on the material imaged. In one embodiment, a method for dual energy imaging of a material comprises generating an odd material density image, generating an even material density image, applying a first weight to the odd material density image and a second weight to the even material density image, and generating a material density image based on a combination of the weighted odd material density image and the weighted even material density image.

SUMMARY

One object of the present disclosure is to provide a method of reading out data in a radiation detector, which method reduces the amount of data read out in the radiation detector.

A further object of the present disclosure is to provide a method of reading out data in a radiation detector, which method provides an efficient readout of data.

A still further object of the present disclosure is to provide a method of reading out data in a radiation detector, which method provides a fast readout of data.

A still further object of the present disclosure is to provide a method of reading out data in a radiation detector, which method enables high quality imaging.

A still further object of the present disclosure is to provide a method of reading out data in a radiation detector, which method enables reliable operation.

A still further object of the present disclosure is to provide a method of reading out data in a radiation detector, which method enables a simple and/or compact design of the radiation detector.

A still further object of the present disclosure is to provide a method of reading out data in a radiation detector, which method solves several or all of the foregoing objects in combination.

A still further object of the present disclosure is to provide a radiation detector solving one, several or all of the foregoing objects.

A still further object of the present disclosure is to provide an imaging apparatus solving one, several or all of the foregoing objects.

According to one aspect, there is provided a method of reading out data in a radiation detector, wherein the radiation detector comprises a plurality of pixels and a plurality of readout circuits associated with the pixels, and wherein each readout circuit comprises at least one register, the method comprising detecting radiation by means of the pixels and storing data indicative of the radiation in one or more of the at least one register of each readout circuit, each time during a plurality of data acquisition periods; and reading out data from one or more of the at least one register of each readout circuit, each time during a plurality of readout periods, each readout period following a data acquisition period, and each readout period being either a low energy readout period or a high energy readout period; wherein only data from a single register of each readout circuit indicative of radiation energy above a low energy level is read out during each low energy readout period; and wherein data indicative of radiation energy above a high energy level, higher than the low energy level, is read out during each high energy readout period.

In many applications, it is enough to read out data, i.e. to sample, only relatively few measurement frames with multiple energies, for example in order to detect contrast media or for beam hardening calculations. Dual and multi-energy photon counting CT can reduce beam hardening and provide better tissue contrast. A measurement frame comprises one data acquisition period and one following readout period. By only reading out data from a single register of each readout circuit indicative of radiation energy above a low energy level during some readout periods (i.e. the low energy readout periods of the method) the amount of data read out can be reduced. In many implementations, also the effective dead time over a complete scan can thereby be reduced. In other words, the method provides a sparse readout of data that is only indicative of radiation energy above a high energy level. Thus, in comparison with a method where data from several different registers of each readout circuit is read out during each readout period, the method provides for a reduced amount of data and a faster scanning.

Furthermore, by reading out data also indicative of radiation energy above a high energy level, higher than the low energy level, during some readout periods (i.e. the high energy readout periods of the method), the method enables high quality imaging and provides for an efficient data handling for multiple energy imaging. The method thus increases the efficiency of the data readout for imaging apparatuses having data acquisition periods and readout periods.

During each readout period, such as the low energy readout periods and the high energy readout periods, data indicative of charges freed in, and transported through, a conversion element of the radiation detector in response to photons being absorbed, may be read out. The data may contain a number of charge pulses of photons being absorbed by the conversion element.

The method comprises reading out data indicative of radiation energy at two or more different energy levels. The method may thus be implemented in dual-energy imaging, but also in multiple energy imaging, for example with six different energy levels.

The radiation detector may be a photon counting direct conversion pixelated detector. The readout circuits may alternatively be referred to as readout cells.

The low energy level may be constituted by one or more low energy bands or one or more open low energy intervals above one or more low energy threshold values. The high energy level may be constituted by one or more high energy bands or one or more open high energy intervals above one or more high energy threshold values.

Throughout the present disclosure, a low energy readout period and a high energy readout period may alternatively be referred to as a first energy readout period and a second energy readout period, respectively, and a low energy level and a high energy level may alternatively be referred to as a first energy level and a second energy level, respectively.

According to one variant, data from a first register of each readout circuit indicative of radiation energy above the low energy level, and data from at least one second register of each readout circuit indicative of radiation energy above at least one high energy level, higher than the low energy level, is read out during each high energy readout period. Thus, in this variant, the high energy readout period constitutes a multiple energy readout period and the low energy readout period constitutes a single energy readout period.

The low energy level may be defined by a first threshold value and the at least one high energy level may be defined by at least one second threshold value, higher than the first threshold value. Thus, only the number of photon events with an energy level above the respective threshold value is stored in the respective register. The threshold value for a low energy readout period may be set prior to, or at start of, a data acquisition period immediately before the low energy readout period. The threshold value for a high energy readout period may be set prior to, or at start of, a data acquisition period immediately before the high energy readout period. One or more of the at least one second threshold value may be variable and set to different values in one or more of the high energy readout periods.

One or more of the at least one second threshold value may be variable and set to different values in one or more of the high energy readout periods. Each threshold value, either static or variable, may be set by means of a threshold setting device according to the present disclosure. The second threshold value may vary cyclically. For example, a second energy level may be read out during a first high energy readout period, a third energy level, higher than the second energy level, may be read out during a second high energy readout period, a fourth energy level, higher than the third energy level, may be read out during a third high energy readout period, and the first high energy readout period may again be read out during a fourth high energy readout period, and so on. Alternatively, or in addition, the first threshold value may be variable and set to different values in one or more of the low energy readout periods.

According to one variant, each of the low energy level and the high energy level is defined by a variable threshold value and wherein only data from a single register of each readout circuit is read out during each low energy readout period and during each high energy readout period. In this way, the number of registers in each readout circuit can be reduced, for example to one register per readout circuit.

A plurality of low energy readout periods may be provided between a first high energy readout period and a next high energy readout period following the first high energy readout period. A sequence of readout periods may thus be: "n" number of low energy readout periods, where "n" is a positive integer, one high energy readout period, "n" number of low energy readout periods, one high energy readout period, and so on.

According to a further aspect, there is provided a radiation detector configured to perform any of the methods according to the present disclosure.

According to a further aspect, there is provided a radiation detector comprising a plurality of pixels configured to detect radiation energy; and a plurality of readout circuits associated with the pixels, and each readout circuit comprises at least one comparator configured to compare an electrical signal representative of the radiation energy from one of the pixels against at least two threshold values including a first threshold value and a second threshold value, and at least one register configured to store low energy data indicative of the electrical signal from the one of the pixels above the first threshold value representing the radiation energy above a low energy level and store high energy data indicative of the electrical signal from the one of the pixels above the second threshold value representing the radiation energy above a high energy level, and the at least one register configured to readout the low energy data and the high energy data.

Each readout circuit may be associated with one of the pixels. Alternatively, a plurality of readout circuits may be associated with one of the pixels, or vice versa. The readout circuits may be provided in a common readout substrate, such as an application-specific integrated circuit (ASIC).

Each register may be configured to temporarily store converted electrical signals from an associated pixel. Throughout the present disclosure, the registers may alternatively be referred to as storage units. Furthermore, each register may comprise, or be constituted by, a counter configured to count the number of photon pulses above a given energy level, which corresponds to a given comparator threshold, and optionally also configured to count the number of photon pulses within a given energy range.

The at least one comparator may comprise a first comparator configured to compare the electrical signal from the one of the pixels against the first threshold value, and a second comparator configured to compare the electrical signal from the one of the pixels against the second threshold value; and wherein the at least one register comprises a first register configured to store low energy data indicative of the electrical signal from the one of the pixels above the first threshold value, and a second register configured to store high energy data indicative of the electrical signal from the one of the pixels above the second threshold value representing the radiation energy above a high energy level.

The at least one comparator may comprise a third comparator configured to compare the electrical signal from the one of the pixels against the third threshold value; and wherein the at least one register comprises a third register configured to store high energy data indicative of the electrical signal from the one of the pixels above the third threshold value representing the radiation energy above a second high energy level and the third register is serially coupled to the second register.

Each readout circuit may further comprise an amplifier configured to receive and amplify the electrical signal from the one of the pixels, and a pulse shaper configured to shape the waveform of the electrical signal from the one of the pixels, and the pulse shaper is operatively coupled to at least one input of the at least one comparator.

The radiation detector may further comprise a threshold setting device configured to set the at least two threshold values for each readout circuit, and optionally, the threshold setting device comprises at least one digital to analog converter (DAC) configured to set the first threshold value or the second threshold value.

Each readout circuit may comprise a switch switchable between a first state decoupling the second register from a serial output, and a second state coupling the second register to the serial output, wherein the switch is coupled to a serial data output of the second register and a serial data input of the first register.

According to one variant, the switch is a single pole, double throw (SPDT) switch; or the switch is in the first state for a duration at least 50% longer than a second state; or each readout circuit between a first readout circuit and a last readout circuit includes the serial data output coupled to a serial data input of a next readout circuit; or the at least one DAC variably sets the second threshold value to different values in one or more readout periods; or the one of the pixels comprises a conversion element including cadmium telluride (CdTe); or the high energy level is higher than the low energy level.

According to a further aspect, there is provided an imaging apparatus comprising the radiation detector according to the present disclosure; and a control unit operatively connected to the radiation detector and configured to read radiation data from the radiation detector.

The imaging apparatus may be a multiple-energy scanning based imaging apparatus. For example, the imaging apparatus may comprise a radiation source and a multiple-energy filter device having a variable spectral transmission characteristic. The radiation detector may for example be one dimensional or two dimensional. Each pixel may be configured to directly convert radiation into an electric charge.

The control unit may comprise a data processing device and a memory having a computer program stored thereon, the computer program comprising program code which, when executed by the data processing device, causes the data processing device to perform, or command performance of, one, several or all steps of the methods according to the present disclosure. The control unit may for example be arranged in the radiation detector or outside the radiation detector.

BRIEF DESCRIPTION OF SEVERAL VIEWS OF THE DRAWINGS

Further details, advantages and aspects of the present disclosure will become apparent from the following embodiments taken in conjunction with the drawings, wherein.

DETAILED DESCRIPTION

In the following, a method of reading out data in a radiation detector, a radiation detector and an imaging apparatus, will be described. The same reference numerals will be used to denote the same or similar structural features.

Figure 1:
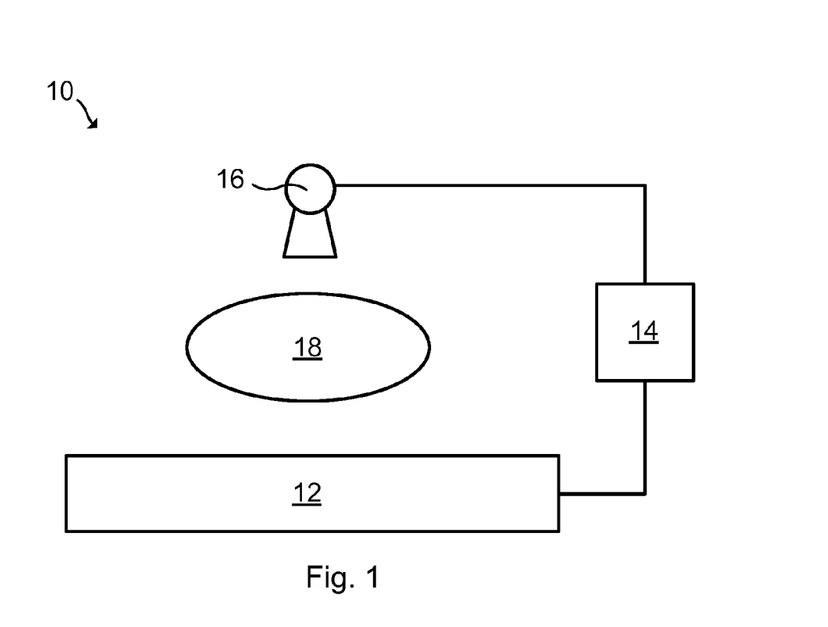
FIG. 1 schematically represents an imaging apparatus comprising a radiation detector.

FIG. 1 schematically represents an imaging apparatus 10. The imaging apparatus 10 comprises a radiation detector 12 and a control unit 14. The imaging apparatus 10 of this example is a multiple-energy imaging apparatus for computed tomography (CT) scanning.

The imaging apparatus 10 further comprises a radiation source 16, such as an X-ray tube, for emitting X-rays that are transmitted through an object 18 to be imaged, for example through the body of a patient. After transmission through the object 18, the X-rays reach the radiation detector 12 where the X-rays are detected and converted into signals representing a spatially resolved projection image of the object 18.

The control unit 14 is operatively connected to the radiation detector 12. The control unit 14 is configured to read radiation data from the radiation detector 12. The control unit 14 may be configured to acquire 2D projection images. The acquired 2D images may be used to reconstruct, for example 3D images, of the object 18 according to known principles of computed tomography.

Figure 2:
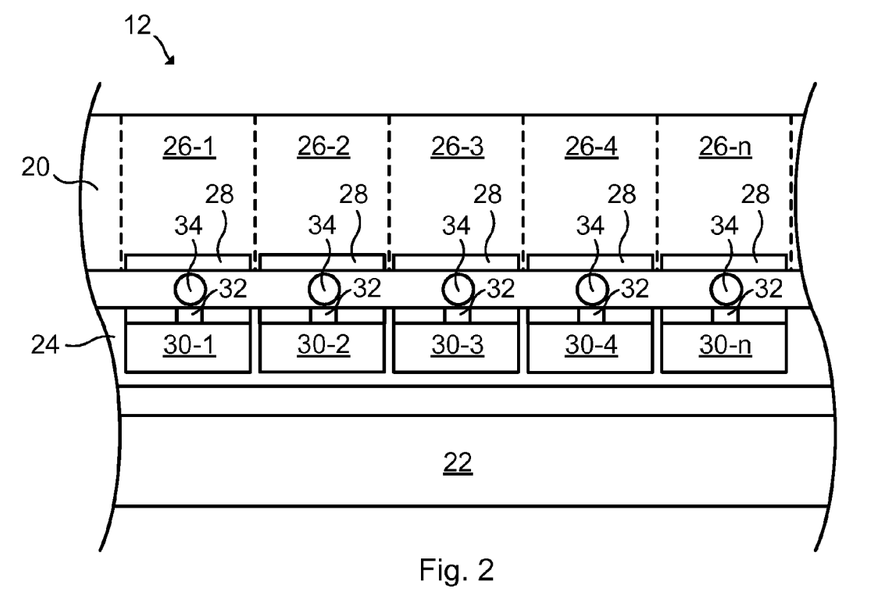
FIG. 2 schematically represents a partial cross-sectional view of the radiation detector comprising a readout substrate.

FIG. 2 schematically represents a partial cross-sectional view of the radiation detector 12 in FIG. 1. The radiation detector 12 comprises a conversion element 20, for example a cadmium telluride (CdTe) crystal, and a readout substrate 24, for example a readout ASIC substrate. The radiation detector 12 further comprises a support substrate 22.

The conversion element 20 comprises a plurality of pixels 26-1, 26-2, 26-3, 26-4, 26-n. Each pixel 26-1, 26-2, 26-3, 26-4, 26-n may also be referred to with reference numeral "26". The pixels 26 are evenly distributed over at least a major part of the radiation detector 12, such as over the entire radiation detector 12. In this example, the conversion element 20 is two-dimensional, i.e. comprising a two-dimensional array of pixels 26.

The conversion element 20 may be constituted by at least one semiconductor substrate, such as a CdTe or cadmium zinc telluride (CdZnTe or CZT) substrate. The conversion element 20 may comprise a continuous conversion substrate or several discrete conversion portions.

The conversion element 20 of this example further comprises a plurality of charge collection electrodes 28, here implemented as contact pads. Each pixel 26 is defined by a charge collection electrode 28.

When X-rays (or other type of ionizing radiation) impinges on the conversion element 20, electron-hole pairs are created inside the conversion element 20 (thus the term "direct conversion") in response to the absorbed energy. Under the influence of an electric field applied across the conversion element 20, these electrons (holes) are transferred to associated charge collection electrodes 28. Thus, the conversion element 20 is configured to produce one or more charge carriers in response to incident radiation. For example, the conversion element 20 can capture and convert incident X-ray photons directly into electric charge.

The readout substrate 24 comprises a plurality of readout circuits 30-1, 30-2, 30-3, 30-4, 30-n. Each readout circuit 30-1, 30-2, 30-3, 30-4, 30-n may also be referred to with reference numeral "30". Each readout circuit 30 comprises a readout electrode 32, here implemented as a contact pad. Each readout circuit 30 is associated with a pixel 26.

The radiation detector 12 further comprises a plurality of interconnections 34. Each pair of one pixel 26 and one readout circuit 30 is connected by means of an interconnection 34. In FIG. 2, the interconnections 34 are exemplified as solder bumps between the charge collection electrodes 28 and the associated readout electrodes 32. Each readout electrode 32 thereby acts as the input to the associated readout circuit 30. Other types of interconnections 34 are however conceivable.

Each readout circuit 30 further comprises at least one electronic component with a function specific for the associated pixel 26. The readout circuit 30 are arranged to process signals generated by the radiation incident on the conversion element 20.

The radiation detector 12 is configured to detect radiation repeatedly in measurement frames, where each measurement frame comprises a data acquisition period and a readout period.

Figure 3:
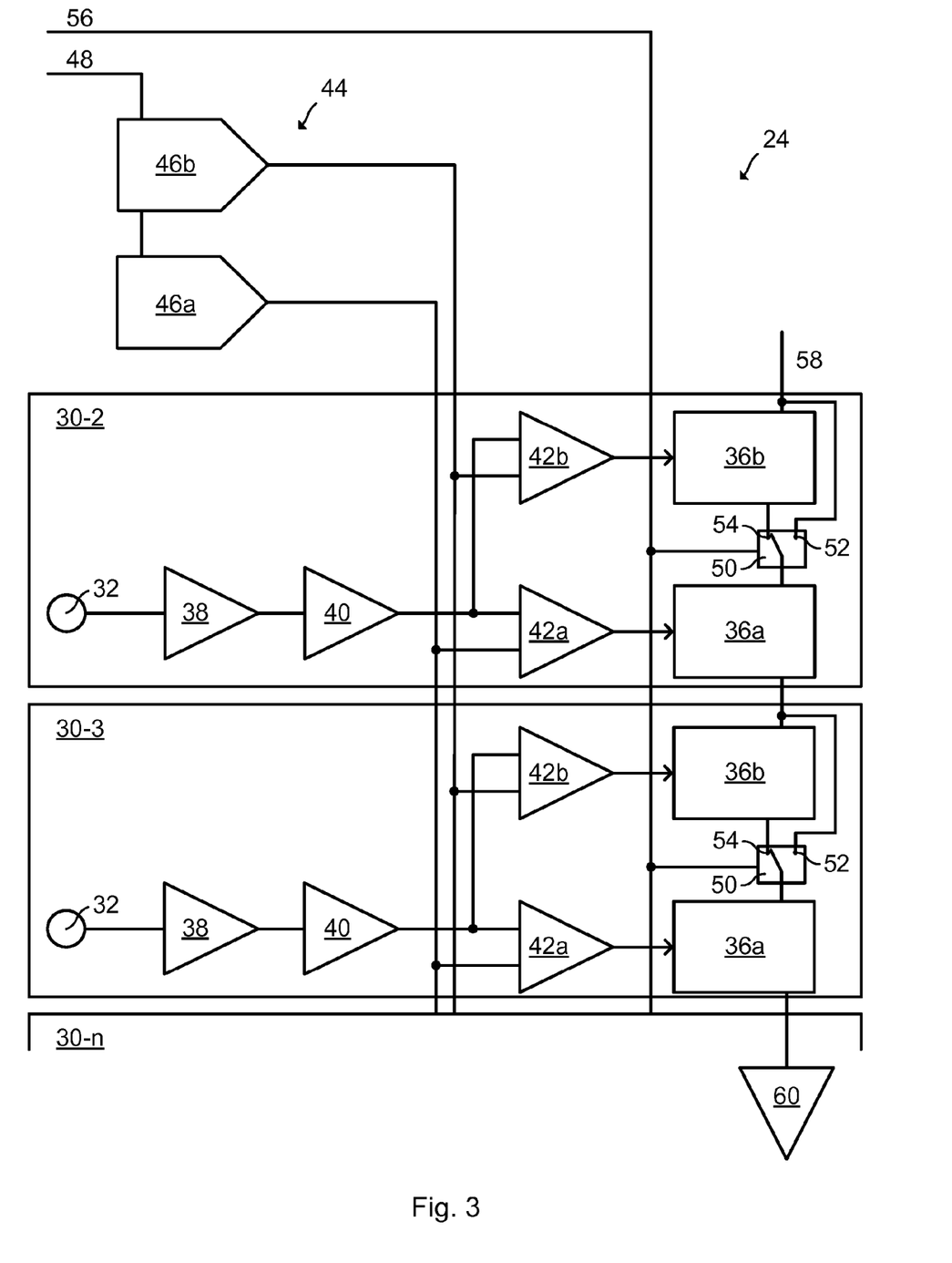
FIG. 3 schematically represents a partial view of the readout substrate.

FIG. 3 schematically represents a partial view of the readout substrate 24. Each readout circuit 30 comprises at least one register (or counter). The register may be a special purpose register or counter. In the example in FIG. 3, each readout circuit 30 comprises a first register (or first counter) 36a and a second register (or second counter) 36b. Each register 36a, 36b may also be referred to with reference numeral "36". However, only one register 36, or more than two registers 36 may alternatively be provided in each readout circuit 30. Each register 36 is configured to temporarily store values corresponding to a converted electrical signal of at least one incoming radiation event from an associated pixel 26.

Each readout circuit 30 is configured to process an input analog signal. As shown in FIG. 3, each readout circuit 30 comprises an amplifier 38, a pulse shaper 40, and two comparators 42a, 42b, one associated with each register 36a, 36b. The amplifier 38 is configured to receive and amplify the electrical signal from the associated pixels 26. The pulse shaper 40 is configured to shape the waveform of the electrical signal from the associated pixel 26. The pulse shaper 40 is operatively coupled to at least one input of each comparators 42a, 42b.

Each amplifier 38 is configured to receive and amplify the electrical signal from the readout electrode 32, which electrical signal is generated in response to incident single x-ray events. Thus, the incoming radiation hits for each photon are converted into an electrical signal, which is then amplified by the amplifier 38.

The pulse shaper 40 of each readout circuit 30 is configured to shape the waveform of the electric pulse from the conversion element 20. The pulse shaper 40 may for example create a bandwidth-limited semi-gaussian output pulse and may act as a noise filter. Each comparator 42a, 42b is connected to the pulse shaper 40. Each comparator 42a, 42b is configured to compare the peak value of an electric pulse from the pulse shaper 40, i.e. the energy of an X-ray photon detected by the conversion element 20, with a threshold value.

The output of each comparator 42a, 42b is connected to an associated register 36a, 36b. When the comparator 42a, 42b determines that the energy of an X-ray photon detected by the conversion element 20 has a peak value above the threshold value set in the comparator 42a, 42b, the comparator 42a, 42b outputs an electric pulse to the register 36a, 36b. The two comparators 42a, 42b are thereby configured to compare an electrical signal representative of the radiation energy from one of the pixels 26 against a first threshold value and a second threshold value.

Each register 36a, 36b of this example comprises a counter configured to count the number of photon pulses above a given energy level set by the associated comparator 42a, 42b. Each register 36a, 36b will count the number of photon pulses in an energy range which corresponds to a given threshold value in the associated comparator 42a, 42b.

The registers 36a, 36b count electric pulses from the comparators 42a, 42b during each data acquisition period. In response to receiving a readout trigger, e.g. from the control unit 14, the registers 36a, 36b start counting electric pulses input from the comparator 42. Every time an electric pulse is generated, the register 36a, 36b increments a stored number by one. In response to receiving the next readout trigger, the register 36a, 36b reads out data (count data) of the count number stored, and resets the data of the count number in the internal memory to an initial value (e.g. 0).

The imaging apparatus 10 further comprises a threshold setting device 44. In the example in FIG. 3, the threshold setting device 44 is provided in the readout substrate 24. The threshold setting device 44 is configured to set a threshold value for each register 36a, 36b in each readout circuit 30. To this end, the threshold setting device 44 comprises a first digital to analog (DA) converter (DAC) 46a arranged to set a threshold value in the first comparator 42a of each readout circuit 30, and a second DA converter 46b arranged to set a threshold value in the second comparator 42b of each readout circuit 30. The threshold setting device 44 is controlled by the control unit 14 via a signal line 48.

Each readout circuit 30 in FIG. 3 further comprises a switch 50. The switch 50 can be a single pole, double throw (SPDT) switch. Each switch 50 is switchable between a first state 52 and a second state 54. The switching of all switches 50 is controlled by the control unit 14 via a signal line 56.

FIG. 3 further shows a signal line 58. The readout circuit 30-2 receives serial data from the previous readout circuit 30-1 via the signal line 58. Data from the readout circuit 30-2 is then added to the serial data and passed on to the next readout circuit 30-3 and so on until serial data 60 from the last readout circuit 30-n is read out. Thus, each readout circuit 30 between a first readout circuit 30-α and a last readout circuit 30-n includes the serial data output coupled to a serial data input of a next readout circuit.

The switch 50 is coupled to a serial data output of the second register 36b and a serial data input of the first register 36a. The switch 50 is also coupled to the signal line 58 from the previous readout circuit 30-1.

When the switch 50 is in the illustrated second state 54, data from both the first register 36a and the second register 36b of each readout circuit 30 is added to the serial data. The second state 54 of the switch 50 thus corresponds to a multiple energy readout mode (dual energy readout mode in this example). In the second state 54 of the switch 50, the second register 36b is coupled to the output of serial data 60 from the last readout circuit 30-n.

When the switch 50 is in the first state 52, only data from the first register 36a of each readout circuit 30 is added to the serial data. The first state 52 of the switch 50 thus corresponds to a single energy readout mode. By means of the switch 50, each readout circuit 30 is configured to selectively bypass at least one register 36b of the readout circuit 30. In the first state 52 of the switch 50, the second register 36b is decoupled from the output of serial data 60 from the last readout circuit 30-n. The switch 50 may be in the first state 52 for a duration at least 50% longer, such as at least 100% longer, than the second state 54.

Figure 4:
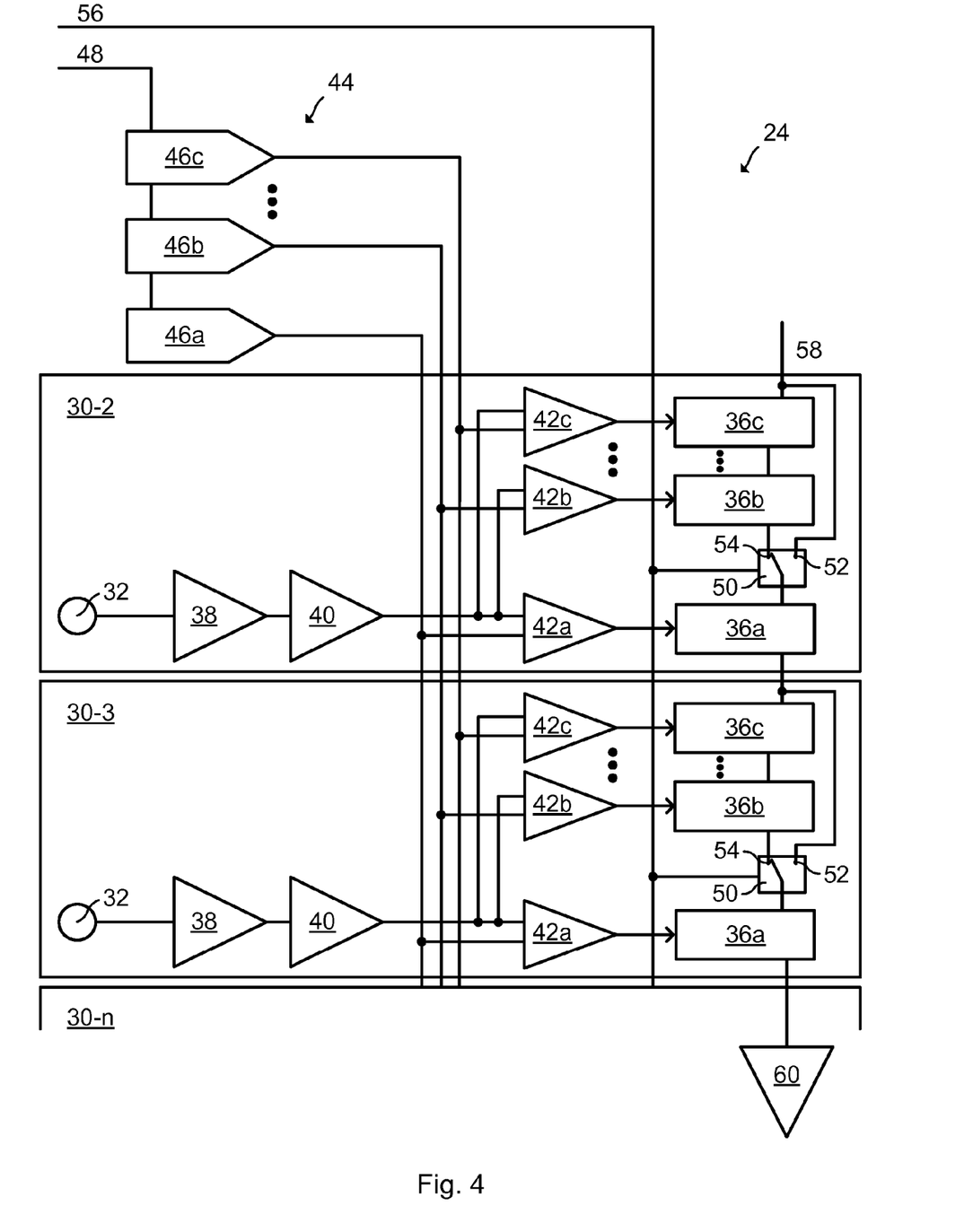
FIG. 4 schematically represents a partial view of an alternative example of a readout substrate.

FIG. 4 schematically represents a partial view of an alternative example of a readout substrate 24. Mainly differences with respect to FIG. 3 will be described. In the example in FIG. 4, each readout circuit 30 comprises a first register (or first counter) 36a, a second register (or second counter) 36b and a third register (or third counter) 36c. Furthermore, each readout circuit 30 comprises an amplifier 38, a pulse shaper 40, and three comparators 42a, 42b, 42c, one associated with each register 36a, 36b, 36c.

In FIG. 4, each comparator 42a, 42b, 42c is connected to the pulse shaper 40. Each comparator 42a, 42b, 42c is configured to compare the peak value of an electric pulse from the pulse shaper 40, i.e. the energy of an X-ray photon detected by the conversion element 20, with a threshold value. The three comparators 42a, 42b, 42c are thereby configured to compare an electrical signal representative of the radiation energy from the associated pixel 26 against a first threshold value, a second threshold value, and a third threshold value. The third register 36c is configured to store high energy data indicative of the electrical signal from the associated pixels 26 above the third threshold value representing the radiation energy above a second high energy level. The third register 36c is serially coupled to the second register 36b.

The output of each comparator 42a, 42b, 42c is connected to an associated register 36a, 36b, 36c. When the comparator 42a, 42b 42c determines that the energy of an X-ray photon detected by the conversion element 20 has a peak value above the threshold value set in the comparator 42a, 42b, 42c, the comparator 42a, 42b, 42c outputs an electric pulse to the register 36a, 36b, 36c.

The threshold setting device 44 of the example in FIG. 4 is configured to set a threshold value for each register 36a, 36b, 36c in each readout circuit 30. To this end, the threshold setting device 44 comprises a first DAC 46a arranged to set a first threshold value in the first comparator 42a of each readout circuit 30, a second DAC 46b arranged to set a second threshold value in the second comparator 42b of each readout circuit 30, and a third DAC 46c arranged to set a third threshold value in the third comparator 42b of each readout circuit 30.

When the switch 50 in FIG. 4 is in the illustrated second state 54, data from each of the first register 36a, the second register 36b and the third register 36c of each readout circuit 30 is added to the serial data. The second state 54 of the switch 50 thus corresponds to a multiple energy readout mode (three energy level readout mode in this example). When the switch 50 is in the first state 52, only data from the first register 36a of each readout circuit 30 is added to the serial data. The first state 52 of the switch 50 thus corresponds to a single energy readout mode. By means of the switch 50, each readout circuit 30 is configured to selectively bypass the second register 36b and the third register 36c of the readout circuit 30.

Although FIG. 4 illustrates three registers 36a, 36b, 36c and comparator 42a, 42b, 42c in each readout circuit 30 and three DACs 46a, 46b, 46c in the threshold setting device 44, in alternate examples, additional register(s) (represented as ellipses) and additional comparator(s) (represented as ellipses) and additional DAC(s) (represented as an ellipsis) may be used. The additional register(s) can be coupled between the registers 36b and 36c and the additional comparator(s) can be coupled to the additional register(s) similar to the coupling of registers 36b and 36c to comparators 42b and 42c, respectively. The additional DAC(s) can be coupled to the additional comparator(s) similar to the coupling of DACs 42b and 42c to comparators 42b and 42c. The additional DAC(s) can also be coupled to the signal line 48 similar to DACs 42b and 42c.

The additional register(s), additional comparator(s), and additional DAC(s) can be used to read out multiple high energy levels with multiple different threshold values during each high energy readout period. For example, with the additional register(s), additional comparator(s), and additional DAC(s), four high energy levels can be read out with four different threshold values during each high energy readout period.

Figure 5:
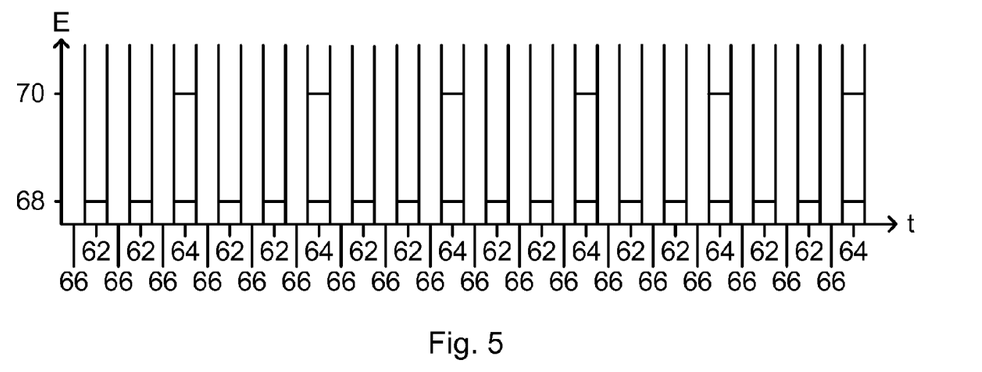
FIG. 5 graphically represents one example of a method of reading out data in the radiation detector.

FIG. 5 graphically represents one example of a timing diagram of a method of reading out data in the radiation detector 12. FIG. 5 is a diagram where the ordinate shows the energy E and the abscissa shows the time t. FIG. 5 shows a plurality of low energy readout periods 62 and a plurality of high energy readout periods 64. In FIG. 5, every third readout period is a high energy readout period 64. However, any "n" readout period may be a high energy readout period 64, where "n" is a positive integer. In FIG. 5, two low energy readout periods 62 are provided between each pair of most adjacent high energy readout periods 64. Each readout period 62, 64 is following a data acquisition period 66. Each pair of data acquisition period 66 and a following readout period 62, 64 constitutes a measurement frame.

In the example in FIG. 5, acquisition of data is not performed during the readout period (dead time). Although the readout periods 62, 64 are illustrated with the same width as the data acquisition periods 66, the data acquisition periods 66 are typically much longer, e.g. ten times longer, than the readout periods 62, 64. The data acquisition periods 66 may be shorter than 10 ms, such as shorter than 5 ms, such as shorter than 1 ms, such as shorter than 0.5 ms. The readout periods 62, 64 may be shorter than 5 ms, such as shorter than 1 ms, such as shorter than 0.5 ms, such as shorter than 0.1 ms.

A low energy level 68 is set by means of a first threshold value and a high energy level 70 is set by means of a second threshold value. The first and second threshold values may be set by the first and second comparators 42a, 42b, respectively (see FIG. 3). According to one non-limiting example, the low energy level 68 may be 6 keV, and the high energy level 70 may be 35 keV. The first register 36a is configured to store low energy data indicative of the electrical signal from the associated pixel 26 above the first threshold value representing the radiation energy above the low energy level 68. The second register 36b is configured to store high energy data indicative of the electrical signal from the associated pixel 26 above the second threshold value representing the radiation energy above the high energy level 70. The registers 36a, 36b are further configured to readout the low energy data and the high energy data.

During each data acquisition period 66, data indicative of the radiation detected by the pixels 26 is stored in the registers 36a, 36b of readout circuits 30 associated with the pixels 26. During each readout period 62, 64, data is read out from one or more registers 36a, 36b of each readout circuit 30. During each low energy readout period 62, only data indicative of radiation energy above the low energy level 68 is read out from each first register 36a. During each high energy readout period 64, data indicative of radiation energy above the high energy level 70 is read out. In the example in FIG. 5, data indicative of radiation energy above the low energy level 68 is read out from the first register 36*a*, and data indicative of radiation energy above the high energy level 70 is read out from the second register 36*b*, during each high energy readout period 64. Thus, in FIG. 5, the high energy readout periods 64 constitute multiple energy readout periods.

The provision of the low energy readout periods 62, during which only data indicative of radiation energy above the low energy level 68 is read out, enables the amount of data read out to be reduced. In addition, the low energy readout periods 62 can be shortened and the scanning can consequentially be made faster. Due to the provision of the high energy readout periods 64, high quality multiple energy imaging (dual energy imaging in FIG. 5) is still enabled.

Figure 6:
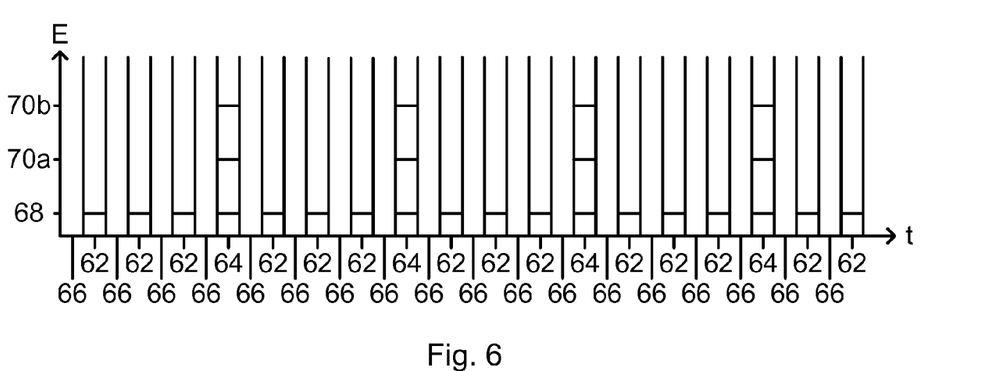
FIG. 6 graphically represents a further example of a method of reading out data in the radiation detector.

FIG. 6 graphically represents a further example of a timing diagram of a method of reading out data in the radiation detector 12. Mainly differences with respect to FIG. 5 will be described. In FIG. 6, every fourth readout period is a high energy readout period 64.

In FIG. 6, a low energy level 68, a first high energy level 70*a*, higher than the low energy level 68, and a second high energy level 70*b*, higher than the first high energy level 70*a*, are used. Each high energy level may also be referred to with reference numeral "70". In order to carry out the method in FIG. 6, each readout circuit 30 comprises three registers 36 with respective threshold values, as illustrated in FIG. 4.

In each low energy readout period 62, data indicative of radiation energy above the low energy level 68 is read out. In each high energy readout period 64, data indicative of radiation energy above the low energy level 68, data indicative of radiation energy above the first high energy level 70*a*, and data indicative of radiation energy above the second high energy level 70*b*, is read out.

Figure 7:
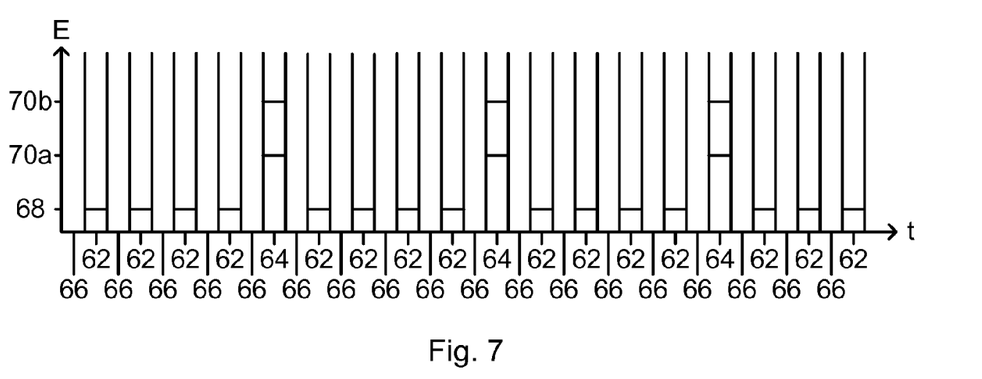
FIG. 7 graphically represents a further example of a method of reading out data in the radiation detector.

FIG. 7 graphically represents a further example of a timing diagram of a method of reading out data in the radiation detector 12. Mainly differences with respect to FIG. 6 will be described. In FIG. 7, every fifth readout period is a high energy readout period 64.

In FIG. 7, data indicative of radiation energy above the low energy level 68 is read out during each low energy readout period 62. However, during each high energy readout period 64, data indicative of radiation energy above the low energy level 68 is not read out. Instead, data indicative of radiation energy above the first high energy level 70*a*, and data indicative of radiation energy above the second high energy level 70*b*, is read out during each high energy readout period 64. The method in FIG. 7 may be carried out with two registers 36 in each readout circuit 30, one with a static threshold value (e.g. for the second high energy level 70*b*) and one with a variable threshold value (e.g. for the low energy level 68 and the first high energy level 70*a*), for example by means of a readout substrate 24 illustrated in FIG. 3.

Figure 8:
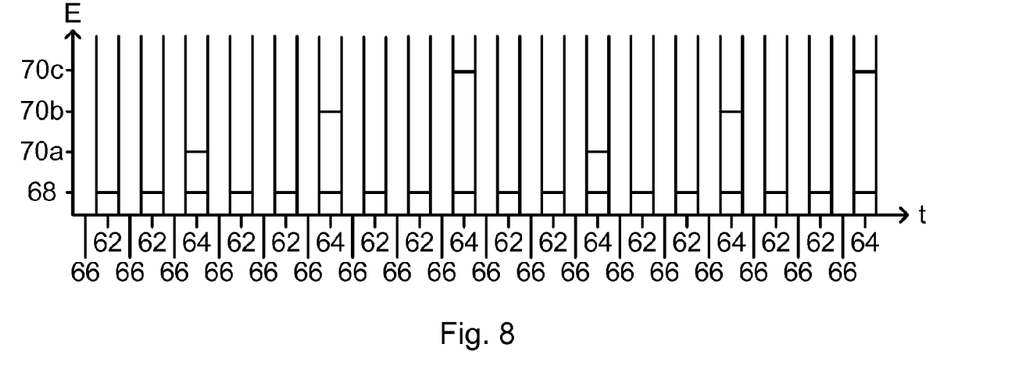
FIG. 8 graphically represents a further example of a method of reading out data in the radiation detector.

FIG. 8 graphically represents a further example of a timing diagram of a method of reading out data in the radiation detector 12. Mainly differences with respect to FIGS. 5 to 7 will be described. In FIG. 8, every third readout period is a high energy readout period 64.

The method in FIG. 8 also employs a third high energy level 70*c*, higher than the second high energy level 70*b*. The method in FIG. 8 may be carried out with only two registers 36 in each readout circuit 30 according to FIG. 3, one register 36 with a static first threshold value defining the low energy level 68, and one register 36 with a variable second threshold value that alternatingly defines the first high energy level 70*a*, the second high energy level 70*b*, and the third high energy level 70*c*. In this case, the DAC 46*b* may variably set the second threshold value to different values in one or more readout periods. Also in FIG. 8, each high energy readout period 64 is a multiple energy readout period.

Figure 9:
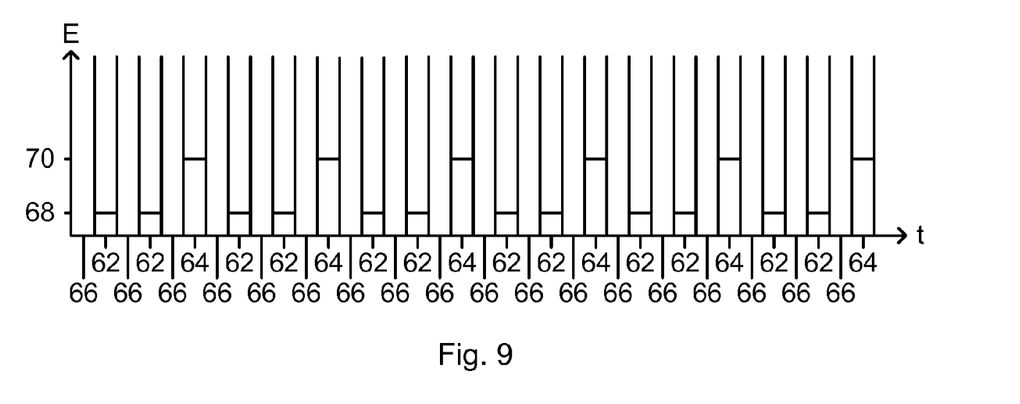
FIG. 9 graphically represents a further example of a method of reading out data in the radiation detector.

FIG. 9 graphically represents a further example of a timing diagram of a method of reading out data in the radiation detector 12. Mainly differences with respect to FIGS. 5 to 8 will be described. The method in FIG. 9 employs a low energy level 68 and a high energy level 70, higher than the low energy level 68. However, each low energy readout period 62 and each high energy readout period 64 is a single energy readout period. Thus, the method in FIG. 9 can be carried out with only one single register 36 in each readout circuit 30. The threshold value in the register 36 is altered between the low energy level 68 for the low energy readout periods 62, and the high energy level 70 for the high energy readout periods 64. The switch 50 remains in the first state 52, so only data from the first register 36*a* of each readout circuit 30 is added to the serial data, as illustrated in FIGS. 3 and 4.

Figure 10:
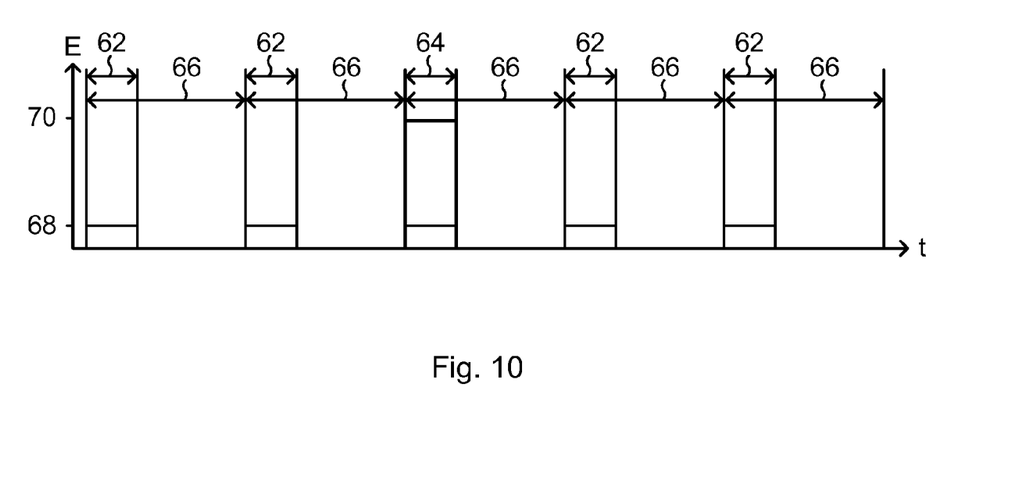
FIG. 10 graphically represents a further example of a method of reading out data in the radiation detector.

FIG. 10 graphically represents a further example of a timing diagram of a method of reading out data in the radiation detector 12. Mainly differences with respect to FIG. 5 will be described. In the example in FIG. 10, each data acquisition period 66 starts before the end of the readout period 62, 64 of the immediately preceding measurement frame. More specifically, each data acquisition period 66 starts at the same time as the start of the readout period 62, 64 of the immediately preceding measurement frame. Thus, the data acquisition periods 66 and the readout periods 62, 64 partly overlap. Each readout period 62, 64 still follows a preceding data acquisition period 66.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method of reading out data in a radiation detector, wherein the radiation detector comprises a plurality of pixels and a plurality of readout circuits associated with the pixels, and wherein each readout circuit comprises a plurality of registers, the method comprising:

detecting radiation by means of the pixels and storing data indicative of the radiation in one or more of the registers of each readout circuit, each time during a plurality of data acquisition periods; and reading out data from one or more of the registers of each readout circuit, each time during a plurality of readout periods, each readout period following a data acquisition period, and each readout period being either a low energy readout period or a high energy readout period;

wherein only data from a first register of the registers of each readout circuit indicative of radiation energy above a low energy level is read out during each low energy readout period; and wherein data from a second register of the registers of each readout circuit indicative of radiation energy above a high energy level, higher than the low energy level, and the data from the first register is read out during each high energy readout period.

2. The method of claim 1, wherein the low energy level is defined by a first threshold value and the high energy level is defined by a second threshold value, higher than the first threshold value.

3. The method of claim 2, wherein the second threshold value is variable and set to different values different high energy readout periods.

4. The method of claim 1, wherein each of the low energy level and the high energy level is defined by a corresponding variable threshold.

5. The method of claim 1, wherein the readout periods comprise a sequence of a plurality of low energy readout periods between a first high energy readout period and a next high energy readout period following the first high energy readout period.

6. The method of claim 4, wherein each readout period at least partially overlaps with a next data acquisition period.

7. A radiation detector comprising:
a plurality of pixels configured to detect radiation energy; and
a plurality of readout circuits associated with the pixels, and each readout circuit comprises:
a plurality of comparators, each comparator configured to compare an electrical signal representative of the radiation energy from one of the pixels against a corresponding threshold;
a plurality of registers coupled in series, each register coupled to a corresponding one of the comparators and configured to store data indicative of an electrical signal from the one of the pixels above the corresponding threshold value;
a serial output; and
a switch configured to selectively bypass at least one of the registers such that in a first state, the at least one of the registers is decoupled from the serial output and in a second state, the at least one of the registers is coupled to the serial output.

8. The radiation detector of claim 7, wherein for each readout circuit:
the comparators comprise:
a first comparator configured to compare the electrical signal from the one of the pixels against a first threshold value representing the radiation energy above a low energy level, and
a second comparator configured to compare the electrical signal from the one of the pixels against a second threshold value representing the radiation energy above a high energy level higher than the low energy level; and
the registers comprise:
a first register configured to store low energy data indicative of the electrical signal from the one of the pixels above the first threshold value, and
a second register configured to store high energy data indicative of the electrical signal from the one of the pixels above the second threshold value.

9. The radiation detector of claim 8, wherein for each readout circuit:
the comparators comprise:
a third comparator configured to compare the electrical signal from the one of the pixels against a third threshold value representing the radiation energy above a second high energy level; and
the registers comprise:
a third register configured to store high energy data indicative of the electrical signal from the one of the pixels above the third threshold value.

10. The radiation detector of claim 7, wherein each readout circuit further comprises:
an amplifier configured to receive and amplify the electrical signal from the one of the pixels, and
a pulse shaper configured to shape a waveform of the electrical signal from the one of the pixels, and the pulse shaper is operatively coupled to inputs of the comparators.

11. The radiation detector of claim 7, further comprising:
a threshold setting device configured to set the threshold values for each readout circuit.

12. The radiation detector of claim 11, wherein the threshold setting device comprises at least one digital to analog converter (DAC) configured to set at least one of first threshold value and a second threshold value of the threshold values.

13. The radiation detector of claim 11, wherein for each readout circuit:
the switch is coupled to a serial data input of a first register of the registers and a serial data output of a second register of the registers.

14. The radiation detector of claim 13, wherein for each readout circuit, the switch is at least a single pole and a double throw (SPDT) switch.

15. The radiation detector of claim 7, wherein;
the readout circuits comprise a first readout circuit, a last readout circuit, and a plurality of intermediate readout circuits serially coupled between the first readout circuit and the last readout circuit; and
each intermediate readout circuit includes the serial output coupled to a serial input of a next readout circuit.

16. The radiation detector of claim 13, wherein each of the pixels comprises a conversion element including cadmium telluride (CdTe).

17. An imaging apparatus comprising:
the radiation detector of claim 7; and
a control unit operatively connected to the radiation detector and configured to read radiation data from the radiation detector.

18. The imaging apparatus of claim 17, wherein:
the control unit is further configured to control the switches of the readout circuits of the radiation detector such that the switch is in the first state for a duration at least 50% longer than a second state.

19. The imaging apparatus of claim 17, wherein:
the control unit is further configured to variably set the threshold value of a corresponding comparator of each of the readout circuits of the radiation detector to different values in different readout periods.

* * * * *